(12) United States Patent
Guo

(10) Patent No.: US 10,522,099 B2
(45) Date of Patent: Dec. 31, 2019

(54) LIQUID CRYSTAL DISPLAY AND LIQUID CRYSTAL DISPLAY PANEL WITH INCREASED CHARGE TIME OF PIXELS AND REDUCED POWER CONSUMPTION

(71) Applicants: BOE TECHNOLOGY GROUP CO., LTD., Beijing (CN); BEIJING BOE OPTOELECTONICS TECHNOLOGY CO., LTD., Beijing (CN)

(72) Inventor: Rui Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 88 days.

(21) Appl. No.: 15/811,197

(22) Filed: Nov. 13, 2017

(65) Prior Publication Data
US 2018/0068622 A1    Mar. 8, 2018

Related U.S. Application Data

(62) Division of application No. 14/126,748, filed as application No. PCT/CN2012/084977 on Nov. 21, 2012, now abandoned.

(30) Foreign Application Priority Data

Mar. 26, 2012 (CN) .......................... 2012 1 0082332

(51) Int. Cl.
| G09G 3/36 | (2006.01) |
| G02F 1/1343 | (2006.01) |
| G02F 1/1362 | (2006.01) |

(52) U.S. Cl.
CPC ......... *G09G 3/36* (2013.01); *G02F 1/134336* (2013.01); *G09G 3/3607* (2013.01);
(Continued)

(58) Field of Classification Search
CPC ...... G09G 3/2003; G09G 3/36; G09G 3/3607; G09G 3/3611; G09G 3/3614;
(Continued)

(56) References Cited

U.S. PATENT DOCUMENTS 6,809,719 B2    10/2004 Wu et al.
9,460,670 B2 *  10/2016 Duan ................ G02F 1/136286
(Continued)

FOREIGN PATENT DOCUMENTS

| CN | 1637560 A | 7/2005 |
| CN | 1983001 A | 6/2007 |
| CN | 102778794 A | 11/2012 |

OTHER PUBLICATIONS

First Chinese Office Action for CN 201210082332.X dated Jul. 30, 2014 (7 pgs.).
(Continued)

*Primary Examiner* — Keith L Crawley

(57) ABSTRACT

A liquid crystal display and a liquid crystal display panel. The liquid crystal display panel (101) includes several data lines, several scanning lines, and n rows and m columns of pixels arranged in the form of matrix, wherein the No. Ni+1, Ni+2, and Ni+N rows of pixels are connected to the No. i+1 scanning line G(i+1) at the same time; i is a nonnegative integer less than or equal to (n/N)−1, N is an odd number greater than or equal to 3, and n is greater than N, thus the charge time of pixel is improved.

12 Claims, 9 Drawing Sheets

(52) U.S. Cl.
CPC ......... *G09G 3/3614* (2013.01); *G09G 3/3648* (2013.01); *G02F 1/136286* (2013.01); *G09G 2300/0426* (2013.01); *G09G 2300/0452* (2013.01)

(58) Field of Classification Search
CPC ......... G09G 3/3648; G09G 2300/0421; G09G 2300/0426; G09G 2300/0452; G09G 2310/0218; G09G 2320/0247; G02F 1/134309; G02F 1/134336; G02F 1/136286
See application file for complete search history.

(56) References Cited

U.S. PATENT DOCUMENTS

| | | | | |
|---|---|---|---|---|
| 2003/0218586 | A1* | 11/2003 | Wu | G09G 3/3648 345/87 |
| 2005/0140907 | A1 | 6/2005 | Yun | |
| 2007/0030233 | A1* | 2/2007 | Chai | G09G 3/3648 345/98 |
| 2007/0132900 | A1 | 6/2007 | Lee | |
| 2009/0189881 | A1* | 7/2009 | Ooishi | G09G 3/20 345/211 |
| 2010/0002156 | A1* | 1/2010 | Tsou | G02F 1/136286 349/33 |
| 2010/0219414 | A1* | 9/2010 | Kim | G09G 3/3614 257/71 |
| 2011/0080434 | A1* | 4/2011 | Tagawa | G09G 3/2003 345/690 |
| 2011/0241526 | A1* | 10/2011 | Huang | G09G 3/3648 313/307 |
| 2012/0200615 | A1* | 8/2012 | Tsubata | G09G 3/3614 345/690 |
| 2013/0321251 | A1* | 12/2013 | Kang | G09G 3/36 345/87 |
| 2014/0111411 | A1 | 4/2014 | Guo | |
| 2014/0125644 | A1* | 5/2014 | Guo | G09G 3/3648 345/209 |

OTHER PUBLICATIONS

English Translation of First Chinese Office Action for CN 201210082332.X dated Jul. 30, 2014 (7 pgs.).
Second Chinese Office Action for CN 201210082332.X dated Mar. 18, 2015 (4 pgs).
English Translation of Second Office Action for CN 201210082332.X dated Mar. 18, 2015 (4 pgs.).
PCT International Preliminary Report on Patentability for PCT/CN2012/084977, dated Oct. 1, 2014 (9 pgs.).
International Search Report for International Application No. PCT/CN2012/08497, dated Mar. 7, 2013 (6 pgs.).
English Abstract of Chinese Application 102778794 (1 pg.).
English Abstract of Chinese Application 1637560 (1 pg.).
English Abstract of Chinese Application 1983001 (1 pg.).

* cited by examiner

LIQUID CRYSTAL DISPLAY AND LIQUID CRYSTAL DISPLAY PANEL WITH INCREASED CHARGE TIME OF PIXELS AND REDUCED POWER CONSUMPTION

CROSS REFERENCE TO RELATED APPLICATIONS

This divisional application is based on U.S. patent application Ser. No. 14/126,748 filed on Dec. 16, 2013, which claims priority to PCT/CN2012/084977 filed on Nov. 21, 2012, which claims priority to Chinese National Application No. 201210082332.X filed on Mar. 26, 2012. The entire contents of each and every foregoing application is incorporated by reference herein.

FIELD OF THE INVENTION

Embodiments of the invention relate to a liquid crystal display (LCD) and a LCD panel.

BACKGROUND

A configuration of conventional LCDs generally comprises a display panel having a sub-pixel array disposed thereon, a source driver for driving source electrodes of the sub-pixels and having data lines, a gate driver for driving gate electrodes of the sub-pixels and having scan lines, a timing controller and a backlight unit.

In conventional technologies, a Dual-Gate technology and a Triple-Gate technology respectively increase the data lines by more than one or two times. Though both technologies may reduce the cost, the charge time of the pixels is decreased as well, making it difficult to meet the requirement on charge time for high-resolution and stereoscopic displays.

For the purpose of meeting the requirement on charge time for high-resolution stereoscopic (3D) displays, the Chinese patent publication CN101494020 titled "A Display Device" discloses a solution of halving the scan lines in the gate driver while doubling the data lines in the source driver, which may double the charge time of the pixels. However, with the development of 3D displays having a refresh rate of 240 Hz and higher resolutions, it requires an ever shorter time for charging hold capacitors when writing pixels. Therefore, it still can not meet the high quality requirement of 3D high resolution display with 240 Hz refresh rate by halving the charge time.

Moreover, in terms of inversion manners, dot inversion may provides the best picture quality with the least flicker. However, for a configuration using the dot inversion as illustrated in FIGS. 2 and 3, with each frame, a polarity of a drive signal on each data line has to be inverted once after the scan time of each scan line, thereby consuming much power and easily increasing the temperature of the source driver on the LCD panel.

SUMMARY

An embodiment of the invention provides a LCD panel LCD panel, comprising: a plurality of data lines; a plurality of scan lines; and a plurality of pixel arranged into a n row m column matrix; wherein pixels in the (Ni+1)th, (Ni+2)th . . . and (Ni+N)th rows are all connected to the (i+1)th scan line G(i+1), i is a non-negative integer less than or equal to (n/N)−1, N is an odd number greater than or equal to 3, and n is greater than or equal to N.

In an embodiment, each pixel comprises M sub-pixels of different primary colors, sub-pixels of each pixel are arranged along a row so as to form a sub-pixel matrix of n row by Mm column, M being 3, 4 or 5.

In an embodiment, the LCD panel employs three primary colors of Red Green Blue, four primary colors of Red Green Blue White, four primary colors of Red Green Blue Yellow or five primary colors of Red Green Blue Yellow White.

In an embodiment, there are n/N scan lines and MNm data lines; sub-pixels in the jth column are respectively connected to the (Nj−N+1)th, (Nj−N+2)th . . . (Nj−1)th, (Nj)th data lines S(Nj−N+1), S(Nj−N+2) . . . S(Nj−1), S(Nj), according to the (Ni+1)th, (Ni+2)th . . . (Ni+N)th rows of the sub-pixel matrix where the sub-pixels are located; where j is an integer greater than or equal to 1 and less than or equal to Mm, i is a non-negative integer less than or equal to (n/N)−1.

In an embodiment, the sub-pixels in the first row have an inversion manner of dot inversion, and the rest of the sub-pixels have an inversion manner of (N−2)+2 dot inversion.

In an embodiment, drive signals on the same data line have the same polarity for the same frame; drive signals on two adjacent data lines have opposite polarities for the same frame; drive signals on the same data line have opposite polarities for different frames.

In an embodiment, there are n/N scan liens and MNm+1 data lines; sub-pixels in the jth column are respectively connected to the (Nj−N+1)th, (Nj−N+2)th . . . (Nj−1)th, (Nj)th, (Nj−N+2)th, (Nj−N+3)th . . . (Nj−1)th, (Nj)th, (Nj+1)th data lines S(Nj−N+1), S(Nj−N+2) . . . S(Nj−1), S(Nj), S(Nj−N+2), S(Nj−N+3) . . . S(Nj−1), S(Nj), S(Nj+1) according to the (2Ni+1)th, (2Ni+2)th, (2Ni+3)th . . . (2Ni+2N−1)th, (2Ni+2N)th rows of the sub-pixel matrix having the sub-pixels; where j is an integer greater than or equal to 1 and less than or equal to Mm, i is a non-negative integer less than or equal to (n/N)−1.

In an embodiment, the sub-pixels have an inversion manner of dot inversion.

In an embodiment, drive signals on the same data line have the same polarity for the same frame; drive signals on two adjacent data lines have opposite polarities for the same frame; drive signals on the same data line have opposite polarities for different frames.

Another embodiment of the invention further provides a LCD comprising the LCD panel implementing the above configurations.

In an embodiment, the LCD further comprises a source driver and a gate driver, wherein the source driver is connected to the LCD panel and has a plurality of drive channels, and supplies drive signals to data lines via the drive channels; the gate driver is connected to the LCD panel and has a plurality of drive channels, and supplies drive signals to scan lines via the drive channels.

The embodiments of the invention provides the LCD and the LCD panel, the LCD panel comprises a plurality of data lines, a plurality of scan lines; and a plurality of pixels arranged into a n row by m column matrix; pixels in the (Ni+1)th, (Ni+2)th . . . and (Ni+N)th rows are connected to the (i+1)th scan line G(i+1), i is a non-negative integer less than or equal to (n/N)−1, N is an odd number greater than or equal to 3, and n is greater than or equal to N. By this means, when the G(i+1) line of the gate driver is turned on, data on the (Ni+1)th to (Ni+N)th rows is written into the corresponding sub-pixels via the corresponding data lines. As a result, the gate driver is reduced to 1/N of the conventional gate driver, and the charge time of the pixels are N times the original charge time, thereby increasing the charge time of the pixels. Moreover, in the embodiment of the invention, drive signals on the same data line have the same polarity for the same frame; drive signals on two adjacent data lines have opposite polarities for the same frame; drive signals on the same data line have opposite polarities for different frames. In terms of the whole picture, the pixels are dot inverted or (N−2)+2 dot inverted, thereby reducing the system power consumption and the temperature.

In total, in comparison with the conventional technologies, the charge time is significantly increased, which meets the emergent requirement on the charge time of pixels for the trend of 3D and high resolution display while reducing the power consumption.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a LCD panel, comprising: a plurality of data lines, a plurality of scan lines; and a plurality of pixels arranged into a n row by m column matrix; pixels in the (Ni+1)th, (Ni+2)th . . . and (Ni+N)th rows are connected to the (i+1)th scan line G(i+1), i is a non-negative integer less than or equal to (n/N)−1, N is an odd number greater than or equal to 3, and n is greater than or equal to N.

In the following, the embodiment of the invention will be described in detail with reference to the drawings and detailed embodiments.

Figure 1:
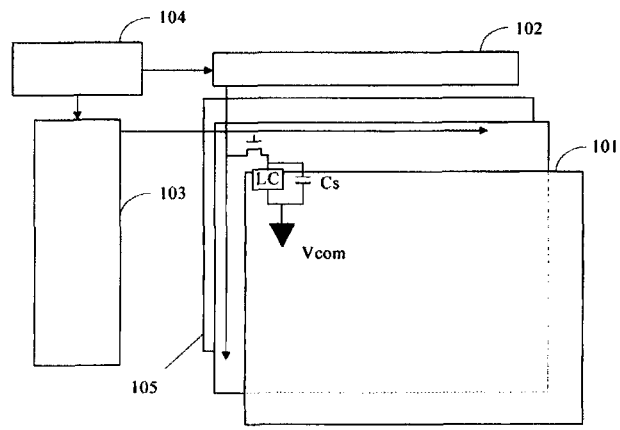
FIG. 1 schematically illustrates a configuration of a LCD in accordance with an embodiment of the invention.
Figure 2:
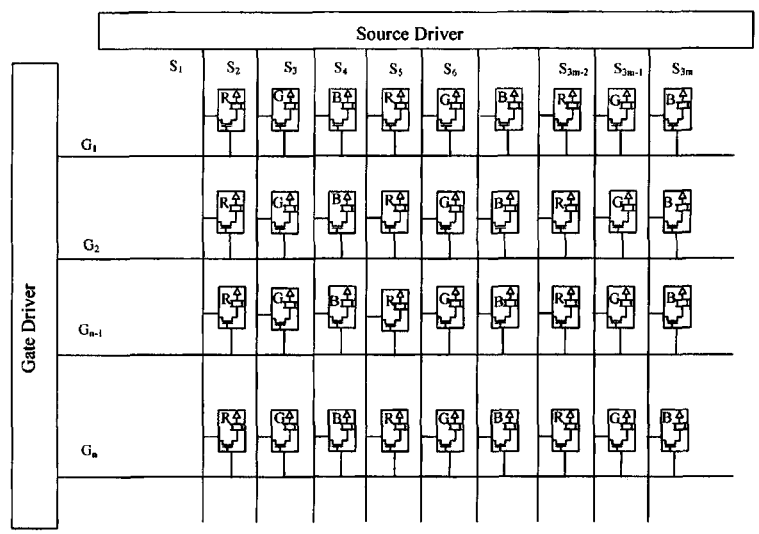
FIG. 2 is a diagram schematically illustrating a sub-pixel array using three primary colors RGB in accordance with conventional arts.
Figure 3:
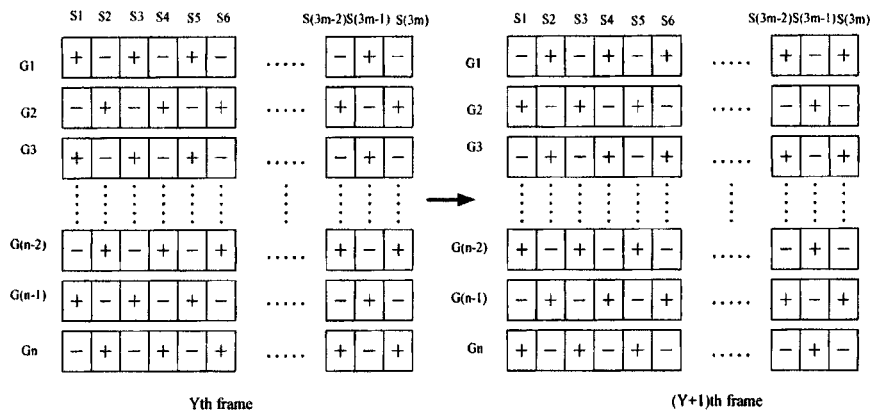
FIG. 3 is a diagram schematically illustrating polarity inversion between two adjacent frames when using three primary colors RGB in accordance with the conventional arts.

FIG. 1 schematically illustrates a configuration of a LCD in accordance with an embodiment of the invention. As illustrated in FIG. 1, the LCD comprises a LCD panel 101 having a sub-pixel array disposed thereon, a source driver 102, a gate driver 103, a timing controller 104, and a backlight unit 105. The source driver 102 is connected to the LCD panel 101 and has a plurality of drive channels, and supplies drive signals to data lines via the drive channels; the gate driver 103 is connected to the LCD panel 101 and has a plurality of drive channels, and supplies drive signals to scan lines via the drive channels; the timing controller 104 is connected to the source driver 102 and the gate driver 103 and adapted for controlling operation of the source driver 102 and the gate driver 103; the backlight unit is adapted for providing backlight needed by the LCD panel 101.

In the embodiment, taking a LCD with a resolution of m*n as an example, there are m row by n column pixels on the LCD panel 101 of such a LCD. The pixels may employ three primary colors of Red Green Blue (RGB), four primary colors of Red Green Blue White (RGBW), four primary colors of Red Green Blue Yellow (RGBW) or five primary colors of Red Green Blue Yellow White (RGBYW). Accordingly, there is a n row by Mm column sub-pixel matrix on the LCD panel, wherein M is equal to the number of primary colors, that is, 3, 4 or 5. As an example, each pixel has M sub-pixels of different primary colors, and sub-pixels of each pixel are arranged along a row.

There are a plurality of data lines, a plurality of scan lines and a plurality of pixels arranged into a matrix on the LCD panel 101. There are totally n/N scan lines and MNm data lines, or there are totally n/N scan lines and MNm+1 data lines; the source driver 102 is adapted for driving source electrodes of the sub-pixels, the gate driver 103 is adapted for driving gate electrodes of the sub-pixels.

In the embodiment, pixels in the (Ni+1)th, (Ni+2)th . . . and (Ni+N)th rows are all connected to the (i+1)th scan line G(i+1), i is a non-negative integer less than or equal to (n/N)−1, N is an odd number greater than or equal to 3, and n is greater than or equal to N; the data lines are connected accordingly such that drive signals on the same data line are of the same polarity for the same frame, drive signals on two adjacent data lines are of the opposite polarities for the same frame, and drive signals on the same data line are of the opposite polarities for different frames.

In the case of having n/N scan lines and MNm data lines, sub-pixels in the jth column are respectively connected to the (Nj−N+1)th, (Nj−N+2)th . . . (Nj−1)th, (Nj)th data lines S(Nj−N+1), S(Nj−N+2) . . . S(Nj−1), S(Nj), according to the (Ni+1)th, (Ni+2)th . . . (Ni+N)th rows of the sub-pixel matrix where the sub-pixels are located; where j is an integer greater than or equal to 1 and less than or equal to Mm, i is a non-negative integer less than or equal to (n/N)−1. In the case of having n/N scan lines and MNm+1 data lines, sub-pixels in the jth column are respectively connected to the (Nj−N+1)th, (Nj−N+2)th . . . (Nj−1)th, (Nj)th, (Nj−N+2)th, (Nj−N+3)th . . . (Nj−1)th, (Nj)th, (Nj+1)th data lines S(Nj−N+1), S(Nj−N+2) . . . S(Nj−1), S(Nj), S(Nj−N+2), S(Nj−N+3) . . . S(Nj−1), S(Nj), S(Nj+1) according to the (2Ni+1)th, (2Ni+2)th, (2Ni+3)th . . . (2Ni+2N−1)th, (2Ni+2N)th rows of the sub-pixel matrix where the sub-pixels are located; where j is an integer greater than or equal to 1 and less than or equal to Mm, i is a non-negative integer less than or equal to (n/N)−1.

Furthermore, for the whole picture, in the case of having n/N scan lines and MNm data lines, an inversion manner for the sub-pixels in the first row is dot inversion, and an inversion manner for the rest of the sub-pixels is (N−2)+2 dot inversion. Herein (N−2)+2 dot inversion refers to the following way of inversion: of sub-pixels in each row other than the first and the nth row, N rows of the sub-pixels are considered as a unit, among which sub-pixels in the first N−2 rows are dot inverted, while those in the remaining two rows are 2 dot inverted. For the whole image, in the case of having n/N scan lines and MNm+1 data lines, all the sub-pixels are dot inverted.

When the G(i+1) line of the gate driver is turned on, data on the (Ni+1)th, (Ni+2)th . . . (Ni+N)th rows is written into the corresponding sub-pixels via the corresponding data lines, where N is an odd number greater than or equal to 3, i is a non-integer less than or equal to (n/N−1).

Embodiment 1

Figure 4:
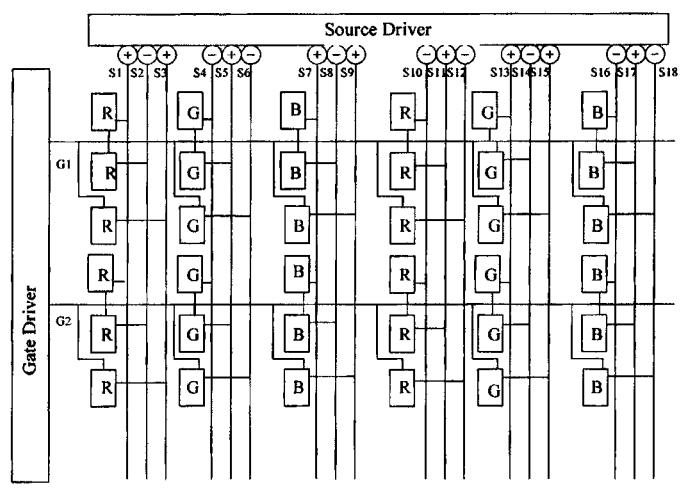
FIG. 4 is a first diagram schematically illustrating a sub-pixel array using three primary colors RGB in accordance with an embodiment of the invention.

As illustrated in FIG. 4, in the embodiment, N is equal to 3 and M is also 3, RGB sub-pixels of the same pixel are disposed horizontally. There are n/3 scan lines and 9m data lines, that is, the scan lines for pixels in the (3i+1)th, (3i+2)th, (3i+3)th row are connected together and then connected to the (i+1)th line G(i+1) of the gate driver, where i is a non-negative integer less than or equal to (n/3)−1; sub-pixels in the jth column are respectively connected to the (3j−2)th, (3j−1)th, (3j)th data lines S(3j−3), S(3j−1), S(3j), according to the different (3i+1)th, (3i+2)th, (3i+3)th rows of the sub-pixel matrix where the sub-pixels are located; where j is an integer greater than or equal to 1 and less than or equal to 3m.

A frame is realized in the following way:

when G1 is turned on, data on the 1st, 2ed, 3rd rows is written to corresponding pixels via the corresponding data lines. For example, data $R_{1,1}$ corresponding to the red sub-pixel in the first row and first column is output at S1, data $R_{2,1}$ corresponding to the red sub-pixel in the second row and first column is output at S2, data $R_{3,1}$ corresponding to the red sub-pixel at the third row and first column is output at S3, . . . , data $B_{1,m}$ corresponding to the blue sub-pixel at the first row and mth column is output at S(9m−2), data $B_{2,m}$ corresponding to the blue sub-pixel at the second row and mth column is output at S(9m−1), data $B_{3,m}$ corresponding to the blue sub-pixel at the third row and mth column is output at S(9m);

when G2 is turned on, data on the 4th, 5th, 6th rows is written to corresponding pixels via the corresponding data lines. For example, data $R_{4,1}$ corresponding to the red sub-pixel in the fourth row and first column is output at S1, data $R_{5,1}$ corresponding to the red sub-pixel in the fifth row and first column is output at S2, data $R_{6,1}$ corresponding to the red sub-pixel at the sixth row and first column is output at S3, . . . , data $B_{4,m}$ corresponding to the blue sub-pixel at the fourth row and mth column is output at S(9m−2), data $B_{5,m}$ corresponding to the blue sub-pixel at the fifth row and mth column is output at S(9m−1), data $B_{6,m}$ corresponding to the blue sub-pixel at the sixth row and mth column is output at S(9m);

. . .

when G(n/3−1) is turned on, data on the (n−5)th, (n−4)th, (n−3)th rows is written to corresponding pixels via the corresponding data lines. For example, data $R_{n-5,1}$ corresponding to the red sub-pixel in the (n−5)th row and first column is output at S1, data $R_{n-4,1}$ corresponding to the red sub-pixel in the (n−4)th row and first column is output at S2, data $R_{n-3,1}$ corresponding to the red sub-pixel at the (n−3)th row and first column is output at S3, . . . , data $B_{n-5,m}$ corresponding to the blue sub-pixel at the (n−5)th row and mth column is output at S(9m−2), data $B_{n-4,m}$ corresponding to the blue sub-pixel at the (n−4)th row and mth column is output at S(9m−1), data $B_{n-3,m}$ corresponding to the blue sub-pixel at the (n−3)th row and mth column is output at S(9m);

when G(n/3) is turned on, data on the (n−2)th, (n−1)th, nth rows is written to corresponding pixels via the corresponding data lines. For example, data $R_{n-2,1}$ corresponding to the red sub-pixel in the (n−2)th row and first column is output at S1, data $R_{n-1,1}$ corresponding to the red sub-pixel in the (n−1)th row and first column is output at S2, data $R_{n,1}$ corresponding to the red sub-pixel at the nth row and first column is output at S3, . . . , data $B_{n-2,m}$ corresponding to the blue sub-pixel at the (n−2)th row and mth column is output at S(9m−2), data $B_{n-1,m}$ corresponding to the blue sub-pixel at the (n−1)th row and mth column is output at S(9m−1), data $B_{n,m}$ corresponding to the blue sub-pixel at the nth row and mth column is output at S(9m).

Figure 5:
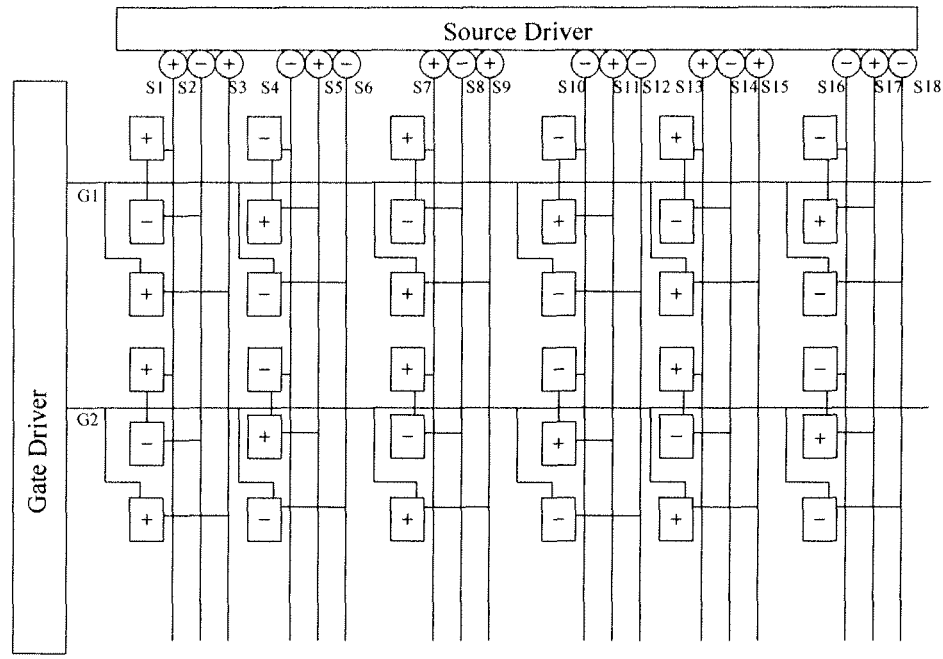
FIGS. 5 and 6 are diagrams schematically illustrating polarity inversion between two adjacent frames when using three primary colors RGB in accordance with the embodiment of the invention.
Figure 6:
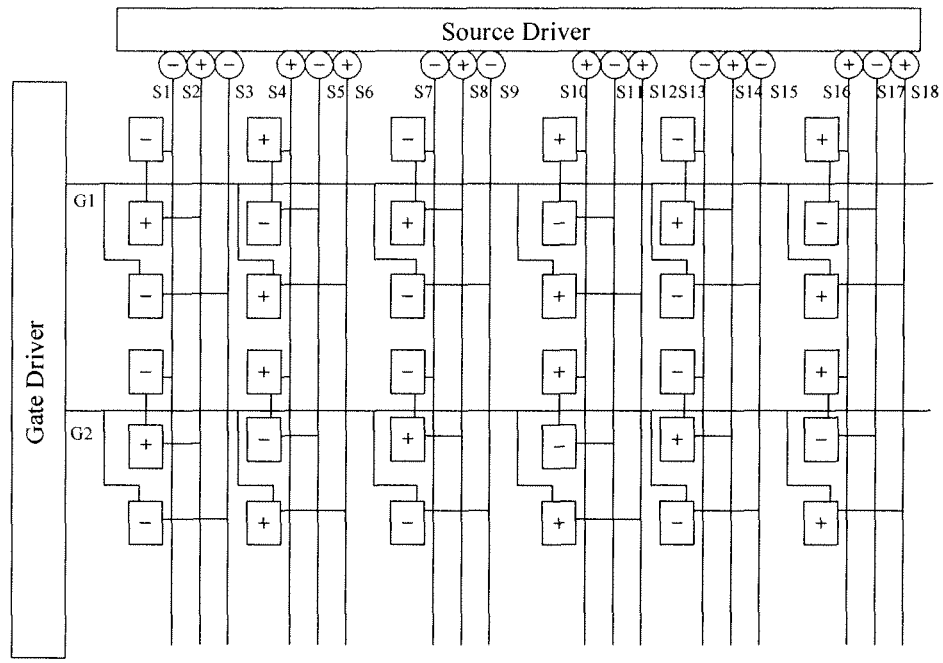

In the embodiment, FIGS. 5 and 6 are diagrams schematically illustrating polarity inversion between two adjacent frames in accordance with the embodiment of the invention. As illustrated in FIG. 5 (the Yth frame) and FIG. 6 (the (Y+1)th frame), when seen from the side of the display panel, the inversion manner for the pixels is 1+2 dot inversion, that is, K rows of pixels are 2 dot inverted, and the pixels in the remaining rows are dot inverted, where K is an integer grater than 1 and less than n, and the remainder of (K−1)/3 is 2 or 0. In terms of the whole picture, of each row other than the first and the nth row and starting from the second row, one row is dot inverted, the following two adjacent rows are two dot inverted, and so on. When seen from the source driver side, for the Yth frame, drive signals on the same data line have the same polarity; for the next frame the (Y+1)th frame, drive signals on that data line have a polarity opposite to that of the driver signals for the previous frame the Yth frame, and drive signals on two adjacent data lines are of opposite polarities when displaying the Yth frame. For example, the first and fourth drive signals on the first data line S1 of FIG. 5 are both positive. In the next frame, the first and fourth drive signals on the first data line S1 of FIG. 6 are both negative. The first data line S1 and the second data line S2 in both FIG. 5 and FIG. 6 are always of opposite polarities. Therefore, in comparison with the conventional art in which the polarity of the drive signals on each data line has to be inverted once after the scan time of each scan line within one frame, the above technical solution may guarantee the picture quality while reducing the power consumption and the system temperature.

Figure 7:
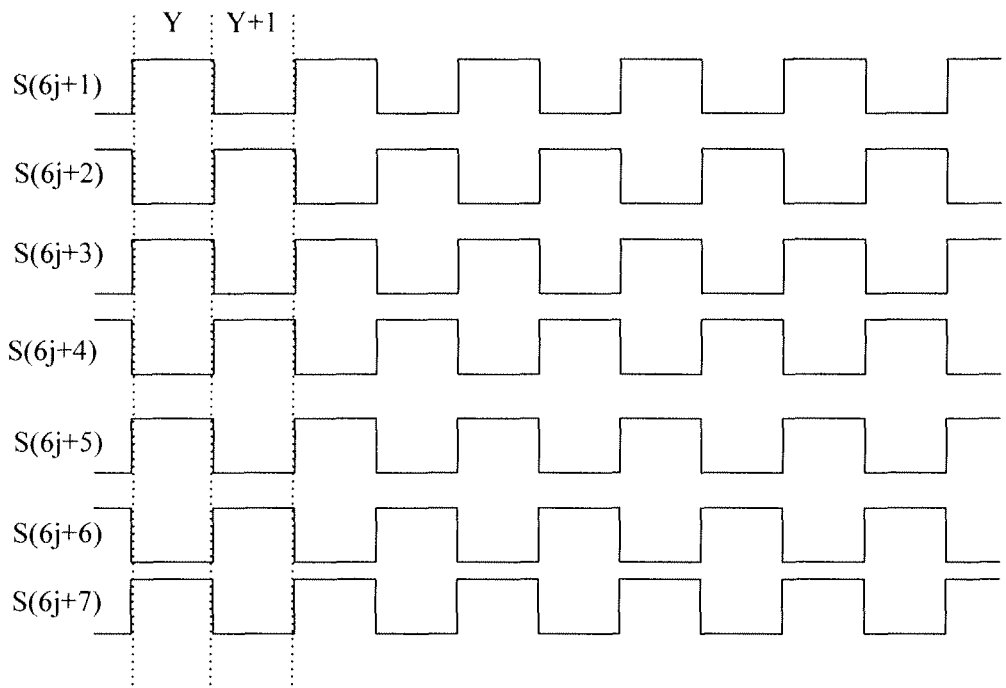
FIG. 7 is a diagram schematically illustrating polarity inversion on source lines of the source driver IC between different frames when using three primary colors RGB in accordance with an embodiment of the invention.

In the embodiment, FIG. 7 is a diagram schematically illustrating polarity inversion on source lines S(6j+1), S(6j+2), S(6j+3), S(6j+4), S(6j+5), S(6j+6), S(6j+7) (here j is an integer larger than or equal to 0) of the source driver between different frames, where the high/low level indicates the polarities output on the data lines instead of the specific data output on the data lines.

Embodiment 2

Figure 8:
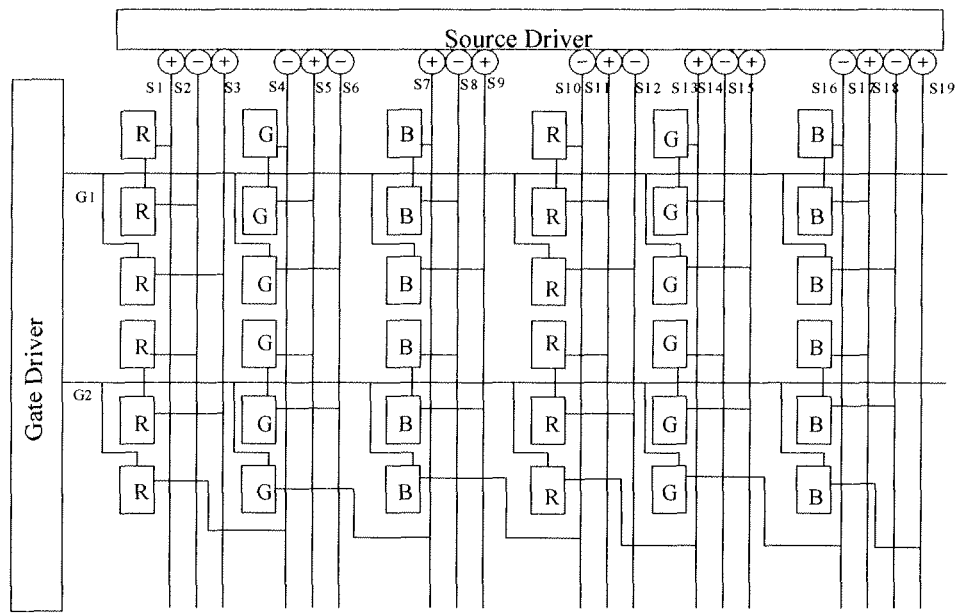
FIG. 8 is a second diagram schematically illustrating a sub-pixel array using three primary colors RGB in accordance with an embodiment of the invention.

As illustrated in FIG. 8, in the embodiment, N is equal to 3 and M is also 3, RGB sub-pixels of the same pixel are disposed horizontally. There are n/3 scan lines and 9m+1 data lines, that is, the scan lines for pixels in the (3i+1)th, (3i+2)th, (3i+3)th row are connected together and then connected to the (i+1)th line G(i+1) of the gate driver, where i is a non-negative integer less than or equal to (n/3)−1; sub-pixels in the jth column are respectively connected to the (3j−2)th, (3j−1)th, (3j)th, (3j−1)th, (3j)th, (3j+1)th data lines S(3j−2), S(3j−1), S(3j), S(3j−1), S(3j), S(3j+1), according to the different (6i+1)th, (6i+2)th, (6i+3)th, (6i+4)th, (6i+5)th, (6i+6)th rows of the sub-pixel matrix where the sub-pixels are located; where j is an integer greater than or equal to 1 and less than or equal to 3m.

A frame is realized in the following way:

when G1 is turned on, data on the 1st, 2ed, 3rd rows is written to corresponding pixels via the corresponding data lines. For example, data $R_{1,1}$ corresponding to the red sub-pixel in the first row and first column is output at S1, data $R_{2,1}$ corresponding to the red sub-pixel in the second row and first column is output at S2, data $R_{3,1}$ corresponding to the red sub-pixel at the third row and first column is output at S3, . . . , data $B_{1,m}$ corresponding to the blue sub-pixel at the first row and mth column is output at S(9m−2), data $B_{2,m}$ corresponding to the blue sub-pixel at the second row and mth column is output at S(9m−1), data $B_{3,m}$ corresponding to the blue sub-pixel at the third row and mth column is output at S(9m);

when G2 is turned on, data on the 4th, 5th, 6th rows is written to corresponding pixels via the corresponding data lines. For example, data $R_{4,1}$ corresponding to the red sub-pixel in the fourth row and first column is output at S2, data $R_{5,1}$ corresponding to the red sub-pixel in the fifth row and first column is output at S3, data $R_{6,1}$ corresponding to the red sub-pixel at the sixth row and first column is output at S4, . . . , data $B_{4,m}$ corresponding to the blue sub-pixel at the fourth row and mth column is output at S(9m−1), data $B_{5,m}$ corresponding to the blue sub-pixel at the fifth row and mth column is output at S(9m), data $B_{6,m}$ corresponding to the blue sub-pixel at the sixth row and mth column is output at S(9m+1);

. . .

when G(n/3−1) is turned on, data on the (n−5)th, (n−4)th, (n−3)th rows is written to corresponding pixels via the corresponding data lines. For example, data $R_{n-5,1}$ corresponding to the red sub-pixel in the (n−5)th row and first column is output at S1, data $R_{n-4,1}$ corresponding to the red sub-pixel in the (n−4)th row and first column is output at S2, data $R_{n-3,1}$ corresponding to the red sub-pixel at the (n−3)th row and first column is output at S3, . . . , data $B_{n-5,m}$ corresponding to the blue sub-pixel at the (n−5)th row and mth column is output at S(9m−2), data $B_{n-4,m}$ corresponding to the blue sub-pixel at the (n−4)th row and mth column is output at S(9m−1), data $B_{n-3,m}$ corresponding to the blue sub-pixel at the (n−3)th row and mth column is output at S(9m);

when G(n/3) is turned on, data on the (n−2)th, (n−1)th, nth rows is written to corresponding pixels via the corresponding data lines. For example, data $R_{n-2,1}$ corresponding to the red sub-pixel in the (n−2)th row and first column is output at S2, data $R_{n-1,1}$ corresponding to the red sub-pixel in the (n−1)th row and first column is output at S3, data $R_{n,1}$ corresponding to the red sub-pixel at the nth row and first column is output at S4, . . . , data $B_{n-2,m}$ corresponding to the blue sub-pixel at the (n−2)th row and mth column is output at S(9m−1), data $B_{n-1,m}$ corresponding to the blue sub-pixel at the (n−1)th row and mth column is output at S(9m), data $B_{n,m}$ corresponding to the blue sub-pixel at the nth row and mth column is output at S(9m+1).

Figure 9:
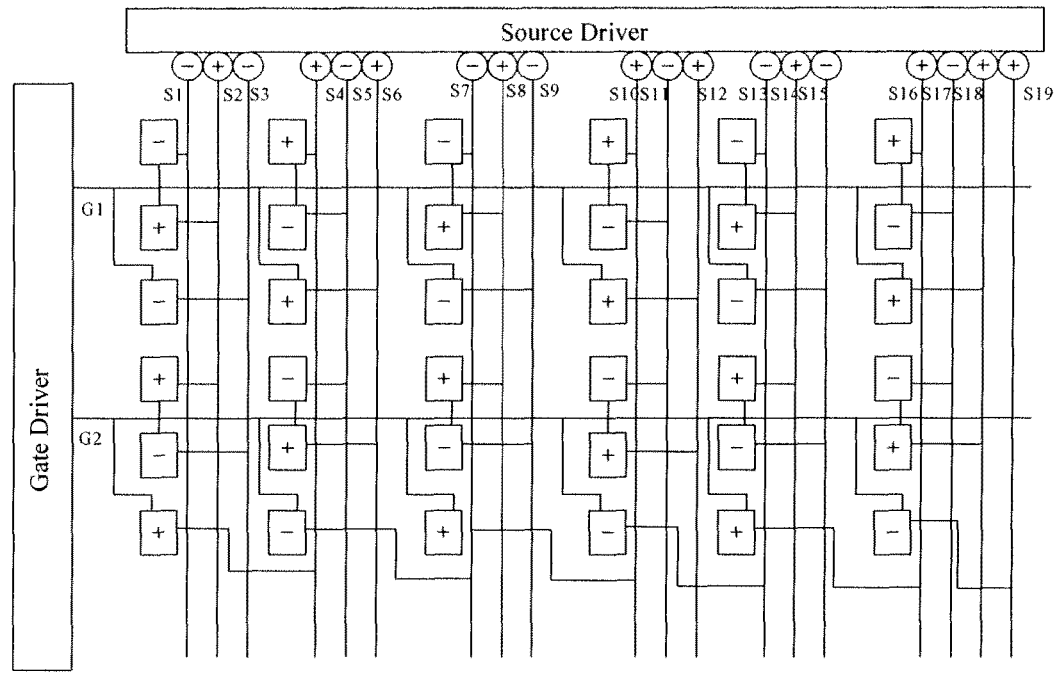
FIG. 9 is a diagram schematically illustrating polarity inversion of drive signal for the same frame when using three primary colors RGB in accordance with an embodiment of the invention.

In the embodiment, as illustrated in the Yth frame and the (Y+1)th frame (FIG. 9), when seen from the side of the display panel, the inversion manner for the pixels is dot inversion. When seen from the gate driver side, for the Yth frame, drive signals on the same data line have the same polarity; for the next frame the (Y+1)th frame, drive signals on that data line have a polarity opposite to that of the driver signals for the previous frame the Yth frame, and drive signals on two adjacent data lines are of opposite polarities when displaying the Yth frame. For example, the first and seventh drive signals (the seventh not shown in the figure) on the first data line S1 of FIG. 8 are both positive. In the next frame, the first and seventh drive signals (the seventh not shown in the figure) on the first data line S1 of FIG. 9 are both negative. The first data line S1 and the second data line S2 in both FIG. 8 and FIG. 9 are always of opposite polarities. Therefore, in comparison with the conventional art in which the polarity of the drive signals on each data line has to be inverted once after the scan time of each scan line within one frame, the above technical solution may guarantee the picture quality while reducing the power consumption and the system temperature.

FIG. 7 is a diagram schematically illustrating polarity inversion on data lines S(6j+1), S(6j+2), S(6j+3), S(6j+4), S(6j+5), S(6j+6), S(6j+7) (here j is an integer larger than or equal to 0) of the source driver between different frames, where the high/low level indicates the polarities output on the data lines instead of the specific data output on the data lines.

Embodiment 3

Figure 10:
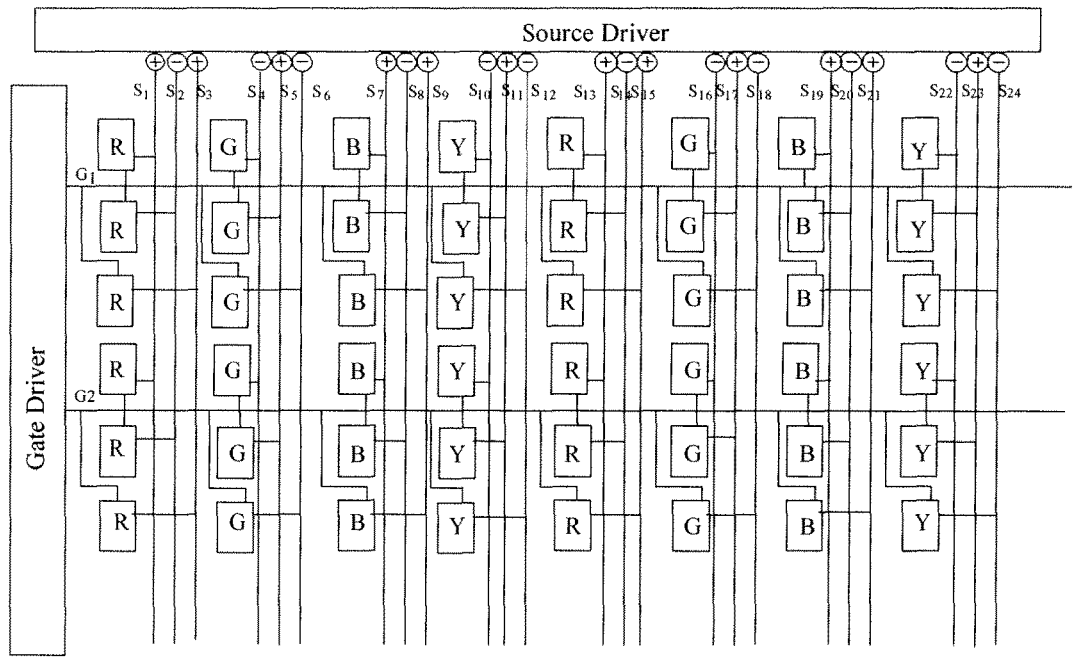
FIG. 10 is a first diagram schematically illustrating a sub-pixel array using four primary colors RGBY in accordance with an embodiment of the invention.

As illustrated in FIG. 10, in the embodiment, N is equal to 3 and M is equal to 4, RGBY sub-pixels of the same pixel are disposed horizontally. There are n/3 scan lines and 12m data lines, that is, the scan lines for pixels in the (3i+1)th, (3i+2)th, (3i+3)th row are connected together and then connected to the (i+1)th line G(i+1) of the gate driver, where i is a non-negative integer less than or equal to (n/3)−1; sub-pixels in the jth column are respectively connected to the (3j−2)th, (3j−1)th, (3j)th data lines S(3j−3), S(3j−1), S(3j), according to the different (3i+1)th, (3i+2)th, (3i+3)th rows of the sub-pixel matrix where the sub-pixels are located; where j is an integer greater than or equal to 1 and less than or equal to 4m.

A frame is realized in the following way:

when G1 is turned on, data on the 1st, 2ed, 3rd rows is written to corresponding pixels via the corresponding data lines. For example, data $R_{1,1}$ corresponding to the red sub-pixel in the first row and first column is output at S1, data $R_{2,1}$ corresponding to the red sub-pixel in the second row and first column is output at S2, data $R_{3,1}$ corresponding to the red sub-pixel at the third row and first column is output at S3, . . . , data $Y_{1,m}$ corresponding to the yellow sub-pixel at the first row and mth column is output at S(12m−2), data $Y_{2,m}$ corresponding to the yellow sub-pixel at the second row and mth column is output at S(12m−1), data $Y_{3,m}$ corresponding to the yellow sub-pixel at the third row and mth column is output at S(12m);

when G2 is turned on, data on the 4th, 5th, 6th rows is written to corresponding pixels via the corresponding data lines. For example, data $R_{4,1}$ corresponding to the red sub-pixel in the fourth row and first column is output at S1, data $R_{5,1}$ corresponding to the red sub-pixel in the fifth row and first column is output at S2, data $R_{6,1}$ corresponding to the red sub-pixel at the sixth row and first column is output at S3, . . . , data $Y_{4,m}$ corresponding to the yellow sub-pixel at the fourth row and mth column is output at S(12m−2), data $Y_{5,m}$ corresponding to the yellow sub-pixel at the fifth row and mth column is output at S(12m−1), data $Y_{6,m}$ corresponding to the yellow sub-pixel at the sixth row and mth column is output at S(12m);

. . .

when G(n/3−1) is turned on, data on the (n−5)th, (n−4)th, (n−3)th rows is written to corresponding pixels via the corresponding data lines. For example, data $R_{n-5,1}$ corresponding to the red sub-pixel in the (n−5)th row and first column is output at S1, data $R_{n-4,1}$ corresponding to the red sub-pixel in the (n−4)th row and first column is output at S2, data $R_{n-3,1}$ corresponding to the red sub-pixel at the (n−3)th row and first column is output at S3, . . . , data $Y_{n-5,m}$ corresponding to the yellow sub-pixel at the (n−5)th row and mth column is output at S(12m−2), data $Y_{n-4,m}$ corresponding to the yellow sub-pixel at the (n−4)th row and mth column is output at S(12m−1), data $Y_{n-3,m}$ corresponding to the yellow sub-pixel at the (n−3)th row and mth column is output at S(12m);

when G(n/3) is turned on, data on the (n−2)th, (n−1)th, nth rows is written to corresponding pixels via the corresponding data lines. For example, data $R_{n-2,1}$ corresponding to the red sub-pixel in the (n−2)th row and first column is output at S1, data $R_{n-1,1}$ corresponding to the red sub-pixel in the (n−1)th row and first column is output at S2, data $R_{n,1}$ corresponding to the red sub-pixel at the nth row and first column is output at S3, . . . , data $Y_{n-2,m}$ corresponding to the yellow sub-pixel at the (n−2)th row and mth column is output at S(12m−2), data $Y_{n-1,m}$ corresponding to the yellow sub-pixel at the (n−1)th row and mth column is output at S(12m−1), data $Y_{n,m}$ corresponding to the yellow sub-pixel at the nth row and mth column is output at S(12m).

Figure 11:
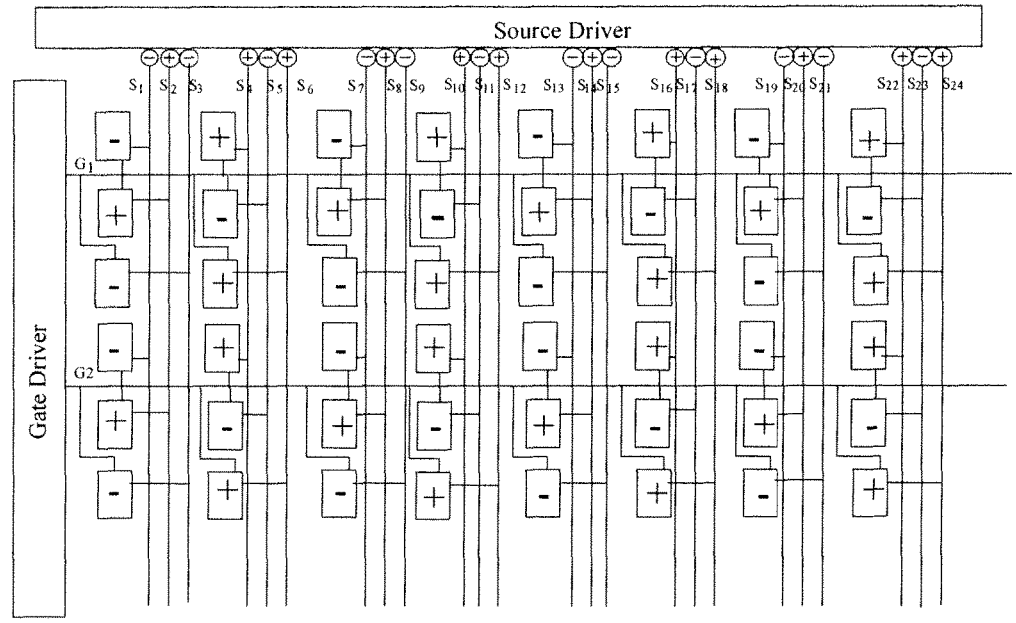
FIG. 11 is a first diagram schematically illustrating polarity inversion of drive signal for the same frame when using four primary colors RGBY in accordance with the embodiment of the invention.

In the embodiment, as illustrated in the Yth frame (FIG. 10) and the (Y+1)th frame (FIG. 11), when seen from the side of the display panel, the inversion manner for the pixels is 1+2 dot inversion, that is, K rows of pixels are 2 dot inverted, and the pixels in the remaining rows are dot inverted, where K is an integer grater than 1 and less than n, and the remainder of (K−1)/3 is 2 or 0. In terms of the whole picture, of each row other than the first and the nth row and starting from the second row, one row is dot inverted, the following two adjacent rows are two dot inverted, and so on. When seen from the gate driver side, for the Yth frame, drive signals on the same data line have the same polarity; for the next frame the (Y+1)th frame, drive signals on that data line have a polarity opposite to that of the driver signals for the previous frame the Yth frame, and drive signals on two adjacent data lines are of opposite polarities when displaying the Yth frame. For example, the first and seventh drive signals (the seventh not shown in the figure) on the first data line S1 of FIG. 10 are both positive. In the next frame, the first and seventh drive signals (the seventh not shown in the figure) on the first data line S1 of FIG. 11 are both negative. The first data line S1 and the second data line S2 in both FIG. 10 and FIG. 11 are always of opposite polarities. Therefore, in comparison with the conventional art in which the polarity of the drive signals on each data line has to be inverted once after the scan time of each scan line within one frame, the above technical solution may guarantee the picture quality while reducing the power consumption and the system temperature.

In the embodiment, FIG. 7 is a diagram schematically illustrating polarity inversion on source lines S(6j+1), S(6j+2), S(6j+3), S(6j+4), S(6j+5), S(6j+6), S(6j+7) of the source driver between different frames, where the high/low level indicates the polarities output on the data lines instead of the specific data output on the data lines.

Embodiment 4

Figure 12:
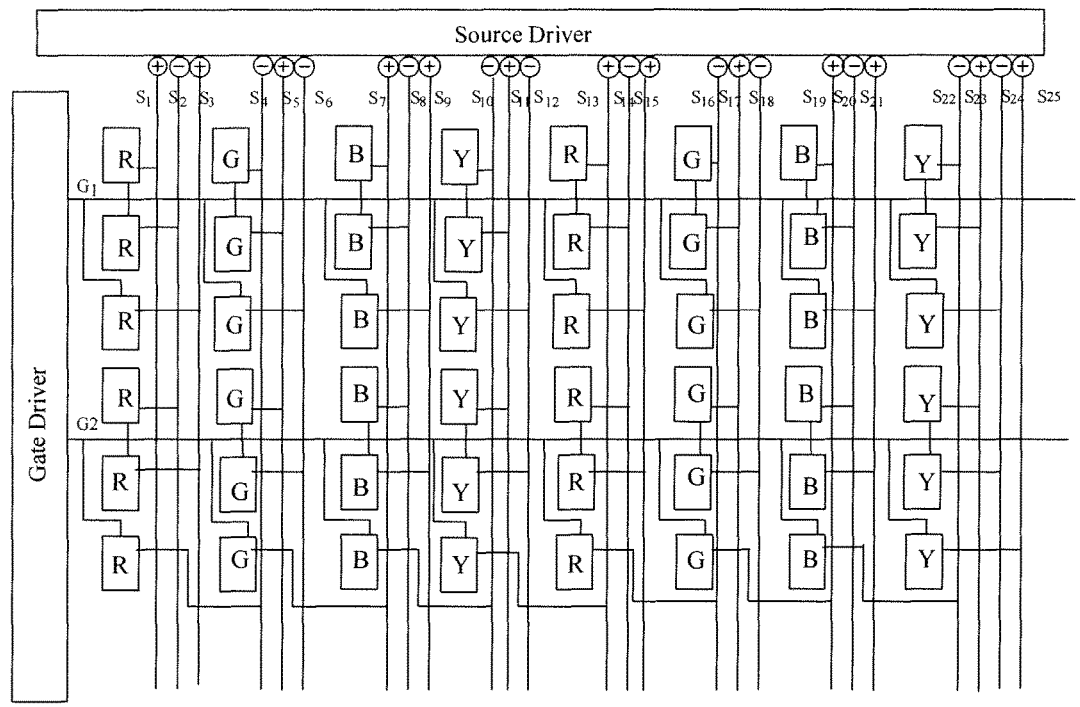
FIG. 12 is a second diagram schematically illustrating a sub-pixel array using four primary colors RGBY in accordance with an embodiment of the invention.

As illustrated in FIG. 12, in the embodiment, N is equal to 3 and M is equal to 4, RGBY sub-pixels of the same pixel are disposed horizontally. There are n/3 scan lines and 12m+1 data lines, that is, the scan lines for pixels in the (3i+1)th, (3i+2)th, (3i+3)th row are connected together and then connected to the (i+1)th line G(i+1) of the gate driver, where i is a non-negative integer less than or equal to (n/3)−1; sub-pixels in the jth column are respectively connected to the (3j−2)th, (3j−1)th, (3j)th, (3j−1)th, (3j)th, (3j+1)th data lines S(3j−2), S(3j−1), S(3j), S(3j−1), S(3j), S(3j−1), S(3j+1), according to the different (6i+1)th, (6i+2)th, (6i+3)th, (6i+4)th, (6i+5)th, (6i+6)th rows of the sub-pixel matrix where the sub-pixels are located; where j is an integer greater than or equal to 1 and less than or equal to 4m.

A frame is realized in the following way:

when G1 is turned on, data on the 1st, 2ed, 3rd rows is written to corresponding pixels via the corresponding data lines. For example, data $R_{1,1}$ corresponding to the red sub-pixel in the first row and first column is output at S1, data $R_{2,1}$ corresponding to the red sub-pixel in the second row and first column is output at S2, data $R_{3,1}$ corresponding to the red sub-pixel at the third row and first column is output at S3, . . . , data $Y_{1,m}$ corresponding to the yellow sub-pixel at the first row and mth column is output at S(12m−2), data $Y_{2,m}$ corresponding to the yellow sub-pixel at the second row and mth column is output at S(12m−1), data $Y_{3,m}$ corresponding to the yellow sub-pixel at the third row and mth column is output at S(12m);

when G2 is turned on, data on the 4th, 5th, 6th rows is written to corresponding pixels via the corresponding data lines. For example, data $R_{4,1}$ corresponding to the red sub-pixel in the fourth row and first column is output at S2, data $R_{5,1}$ corresponding to the red sub-pixel in the fifth row and first column is output at S3, data $R_{6,1}$ corresponding to the red sub-pixel at the sixth row and first column is output at S4, ..., data $Y_{4,m}$ corresponding to the yellow sub-pixel at the fourth row and mth column is output at S(12m−1), data $Y_{5,m}$ corresponding to the yellow sub-pixel at the fifth row and mth column is output at S(12m), data $Y_{6,m}$ corresponding to the yellow sub-pixel at the sixth row and mth column is output at S(12m+1);

...

when G(n/3−1) is turned on, data on the (n−5)th, (n−4)th, (n−3)th rows is written to corresponding pixels via the corresponding data lines. For example, data $R_{n-5,1}$ corresponding to the red sub-pixel in the (n−5)th row and first column is output at S1, data $R_{n-4,1}$ corresponding to the red sub-pixel in the (n−4)th row and first column is output at S2, data $R_{n-3,1}$ corresponding to the red sub-pixel at the (n−3)th row and first column is output at S3, ..., data $Y_{n-5,m}$ corresponding to the yellow sub-pixel at the (n−5)th row and mth column is output at S(12m−2), data $Y_{n-4,m}$ corresponding to the yellow sub-pixel at the (n−4)th row and mth column is output at S(12m−1), data $Y_{n-3,m}$ corresponding to the yellow sub-pixel at the (n−3)th row and mth column is output at S(12m);

when G(n/3) is turned on, data on the (n−2)th, (n−1)th, nth rows is written to corresponding pixels via the corresponding data lines. For example, data $R_{n-2,1}$ corresponding to the red sub-pixel in the (n−2)th row and first column is output at S2, data $R_{n-1,1}$ corresponding to the red sub-pixel in the (n−1)th row and first column is output at S3, data $R_{n,1}$ corresponding to the red sub-pixel at the nth row and first column is output at S4, ..., data $Y_{n-2,m}$ corresponding to the yellow sub-pixel at the (n−2)th row and mth column is output at S(12m−1), data $Y_{n-1,m}$ corresponding to the yellow sub-pixel at the (n−1)th row and mth column is output at S(12m), data $Y_{n,m}$ corresponding to the yellow sub-pixel at the nth row and mth column is output at S(12m+1).

Figure 13:
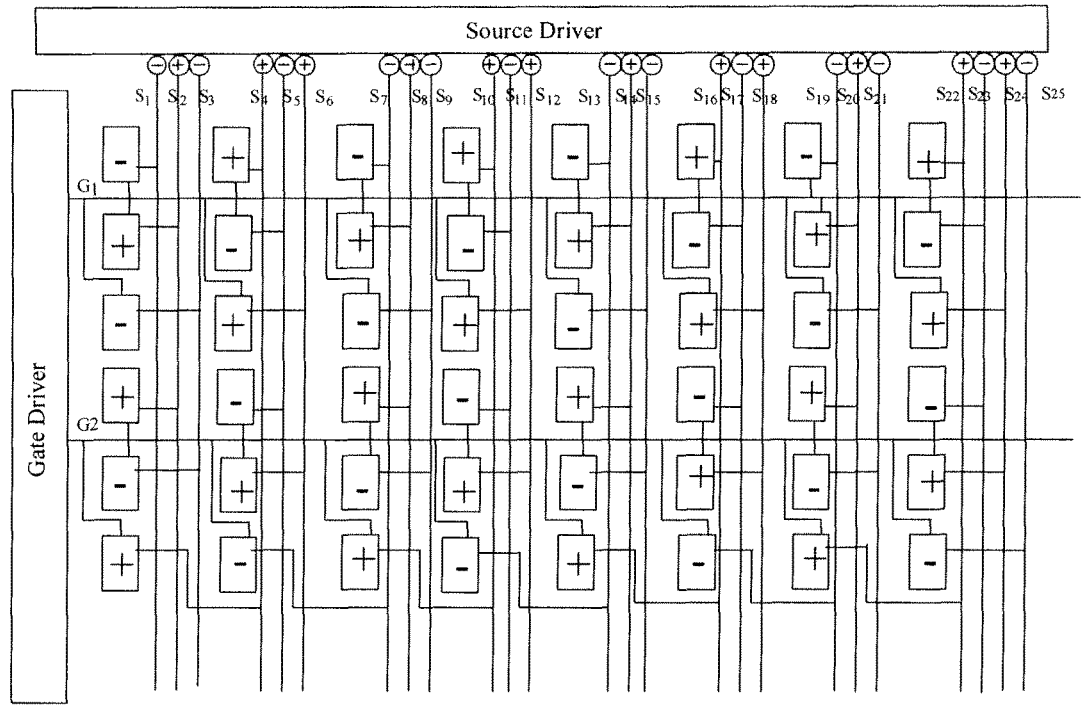
FIG. 13 is a second diagram schematically illustrating polarity inversion of drive signal for the same frame when using four primary colors RGBY in accordance with the embodiment of the invention.

In the embodiment, as illustrated in the Yth frame (FIG. 12) and the (Y+1)th frame (FIG. 13), when seen from the side of the display panel, the inversion manner for the pixels is dot inversion. When seen from the gate driver side, for the Yth frame, drive signals on the same data line have the same polarity; for the next frame the (Y+1)th frame, drive signals on that data line have a polarity opposite to that of the driver signals for the previous frame the Yth frame, and drive signals on two adjacent data lines are of opposite polarities when displaying the Yth frame. For example, the first and seventh drive signals (the seventh not shown in the figure) on the first data line S1 of FIG. 12 are both positive. In the next frame, the first and seventh drive signals (the seventh not shown in the figure) on the first data line S1 of FIG. 13 are both negative. The first data line S1 and the second data line S2 in both FIG. 12 and FIG. 13 are always of opposite polarities. Therefore, in comparison with the conventional art in which the polarity of the drive signals on each data line has to be inverted once after the scan time of each scan line within one frame, the above technical solution may guarantee the picture quality while reducing the power consumption and the system temperature.

FIG. 7 is a diagram schematically illustrating polarity inversion on source lines S(6j+1), S(6j+2), S(6j+3), S(6j+4), S(6j+5), S(6j+6), S(6j+7) (here j is an integer larger than or equal to 0) of the source driver between different frames, where the high/low level indicates the polarities output on the data lines instead of the specific data output on the data lines.

Embodiment 5

Figure 14:
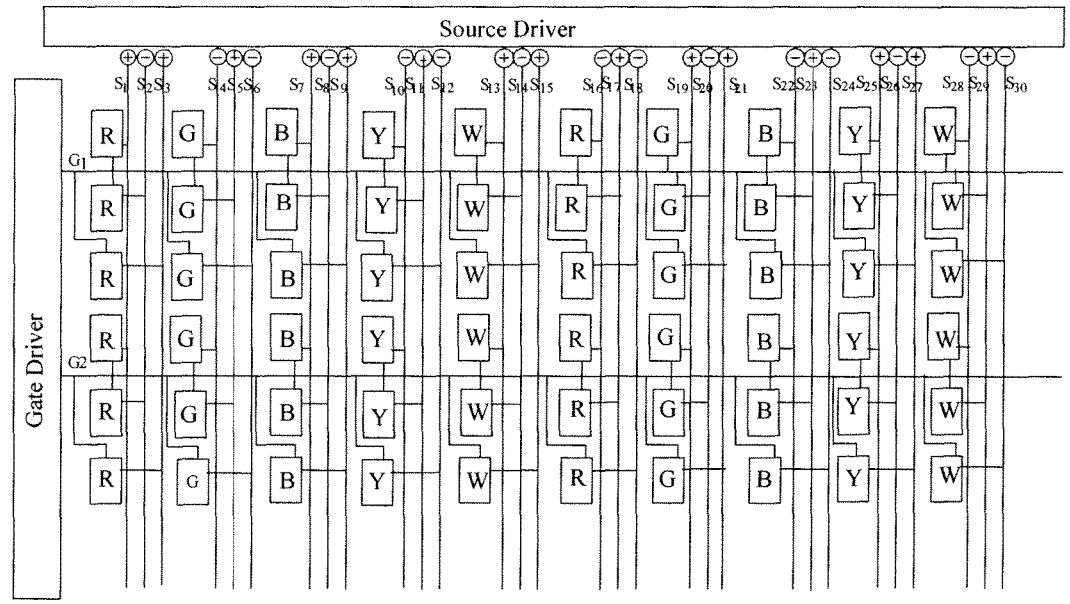
FIG. 14 is a first diagram schematically illustrating a sub-pixel array using five primary colors RGBYW in accordance with an embodiment of the invention.

As illustrated in FIG. 14, in the embodiment, N is equal to 3 and M is equal to 5, RGBYW sub-pixels of the same pixel are disposed horizontally. There are n/3 scan lines and 15m data lines, that is, the scan lines for pixels in the (3i+1)th, (3i+2)th, (3i+3)th row are connected together and then connected to the (i+1)th line G(i+1) of the gate driver, where i is a non-negative integer less than or equal to (n/3)−1; sub-pixels in the jth column are respectively connected to the (3j−2)th, (3j−1)th, (3j)th data lines S(3j−3), S(3j−1), S(3j), according to the different (3i+1)th, (3i+2)th, (3i+3)th rows of the sub-pixel matrix where the sub-pixels are located; where j is an integer greater than or equal to 1 and less than or equal to 5m.

A frame is realized in the following way:

when G1 is turned on, data on the 1st, 2ed, 3rd rows is written to corresponding pixels via the corresponding data lines. For example, data $R_{1,1}$ corresponding to the red sub-pixel in the first row and first column is output at S1, data $R_{2,1}$ corresponding to the red sub-pixel in the second row and first column is output at S2, data $R_{3,1}$ corresponding to the red sub-pixel at the third row and first column is output at S3, ..., data $W_{1,m}$ corresponding to the white sub-pixel at the first row and mth column is output at S(15m−2), data $W_{2,m}$ corresponding to the white sub-pixel at the second row and mth column is output at S(15m−1), data $W_{3,m}$ corresponding to the white sub-pixel at the third row and mth column is output at S(15m);

when G2 is turned on, data on the 4th, 5th, 6th rows is written to corresponding pixels via the corresponding data lines. For example, data $R_{4,1}$ corresponding to the red sub-pixel in the fourth row and first column is output at S1, data $R_{5,1}$ corresponding to the red sub-pixel in the fifth row and first column is output at S2, data $R_{6,1}$ corresponding to the red sub-pixel at the sixth row and first column is output at S3, ..., data $W_{4,m}$ corresponding to the white sub-pixel at the fourth row and mth column is output at S(15m−2), data $W_{5,m}$ corresponding to the white sub-pixel at the fifth row and mth column is output at S(15m−1), data $W_{6,m}$ corresponding to the white sub-pixel at the sixth row and mth column is output at S(15m);

...

when G(n/3−1) is turned on, data on the (n−5)th, (n−4)th, (n−3)th rows is written to corresponding pixels via the corresponding data lines. For example, data $R_{n-5,1}$ corresponding to the red sub-pixel in the (n−5)th row and first column is output at S1, data $R_{n-4,1}$ corresponding to the red sub-pixel in the (n−4)th row and first column is output at S2, data $R_{n-3,1}$ corresponding to the red sub-pixel at the (n−3)th row and first column is output at S3, ..., data $W_{n-5,m}$ corresponding to the white sub-pixel at the (n−5)th row and mth column is output at S(15m−2), data $W_{n-4,m}$ corresponding to the white sub-pixel at the (n−4)th row and mth column is output at S(15m−1), data corresponding to the white sub-pixel at the (n−3)th row and mth column is output at S(15m);

when G(n/3) is turned on, data on the (n−2)th, (n−1)th, nth rows is written to corresponding pixels via the corresponding data lines. For example, data $R_{n-2,1}$ corresponding to the red sub-pixel in the (n−2)th row and first column is output at S1, data $R_{n-1,1}$ corresponding to the red sub-pixel in the (n−1)th row and first column is output at S2, data $R_{n,1}$ corresponding to the red sub-pixel at the nth row and first column is output at S3, ..., data $W_{n-2,m}$ corresponding to the white sub-pixel at the (n−2)th row and mth column is output at S(15m−2), data $W_{n-1,m}$ corresponding to the white sub-pixel at the (n−1)th row and mth column is output at S(15m−1), data $W_{n,m}$ corresponding to the white sub-pixel at the nth row and mth column is output at S(15m).

Figure 15:
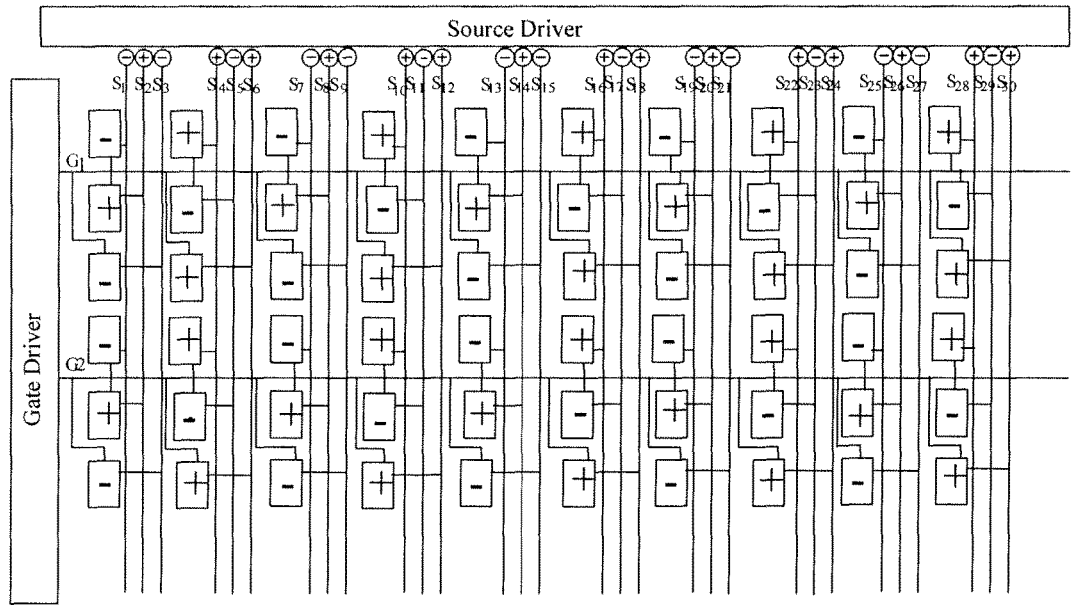
FIG. 15 is a first diagram schematically illustrating polarity inversion of drive signal for the same frame when using five primary colors RGBYW in accordance with the embodiment of the invention.

In the embodiment, as illustrated in the Yth frame (FIG. 14) and the (Y+1)th frame (FIG. 15), when seen from the side of the display panel, the inversion manner for the pixels is 1+2 dot inversion, that is, K rows of pixels are 2 dot inverted, and the pixels in the remaining rows are dot inverted, where K is an integer grater than 1 and less than n, and the remainder of (K−1)/3 is 2 or 0. In terms of the whole picture, of each row other than the first and the nth row and starting from the second row, one row is dot inverted, the following two adjacent rows are two dot inverted, and so on. When seen from the gate driver side, for the Yth frame, drive signals on the same data line have the same polarity; for the next frame the (Y+1)th frame, drive signals on that data line have a polarity opposite to that of the driver signals for the previous frame the Yth frame, and drive signals on two adjacent data lines are of opposite polarities when displaying the Yth frame. For example, the first and seventh drive signals (the seventh not shown in the figure) on the first data line S1 of FIG. 14 are both positive. In the next frame, the first and seventh drive signals (the seventh not shown in the figure) on the first data line S1 of FIG. 15 are both negative. The first data line S1 and the second data line S2 in both FIG. 14 and FIG. 15 are always of opposite polarities. Therefore, in comparison with the conventional art in which the polarity of the drive signals on each data line has to be inverted once after the scan time of each scan line within one frame, the above technical solution may guarantee the picture quality while reducing the power consumption and the system temperature.

In the embodiment, FIG. 7 is a diagram schematically illustrating polarity inversion on source lines S(6j+1), S(6j+2), S(6j+3), S(6j+4), S(6j+5), S(6j+6), S(6j+7) of the source driver between different frames, where the high/low level indicates the polarities output on the data lines instead of the specific data output on the data lines.

Embodiment 6

Figure 16:
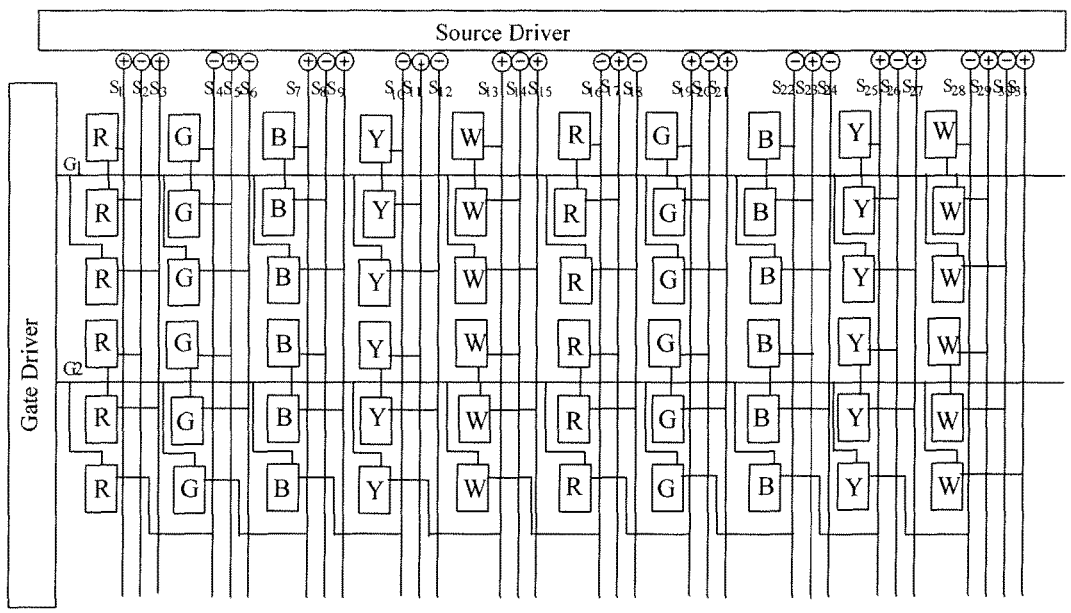
FIG. 16 is a second diagram schematically illustrating a sub-pixel array using five primary colors RGBYW in accordance with an embodiment of the invention.

As illustrated in FIG. 16, in the embodiment, N is equal to 3 and M is equal to 5, RGBYW sub-pixels of the same pixel are disposed horizontally. There are n/3 scan lines and 15m+1 data lines, that is, the scan lines for pixels in the (3i+1)th, (3i+2)th, (3i+3)th row are connected together and then connected to the (i+1)th line G(i+1) of the gate driver, where i is a non-negative integer less than or equal to (n/3)−1; sub-pixels in the jth column are respectively connected to the (3j−2)th, (3j−1)th, (3j)th, (3j−1)th, (3j)th, (3j+1)th data lines S(3j−2), S(3j−1), S(3j), S(3j−1), S(3j), S(3j−1), S(3j+1), according to the different (6i+1)th, (6i+2)th, (6i+3)th, (6i+4)th, (6i+5)th, (6i+6)th rows of the sub-pixel matrix where the sub-pixels are located; where j is an integer greater than or equal to 1 and less than or equal to 5m.

A frame is realized in the following way:

when G1 is turned on, data on the 1st, 2ed, 3rd rows is written to corresponding pixels via the corresponding data lines. For example, data $R_{1,1}$ corresponding to the red sub-pixel in the first row and first column is output at S1, data $R_{2,1}$ corresponding to the red sub-pixel in the second row and first column is output at S2, data $R_{3,1}$ corresponding to the red sub-pixel at the third row and first column is output at S3, . . . , data $W_{1,m}$ corresponding to the white sub-pixel at the first row and mth column is output at S(15m−2), data $W_{2,m}$ corresponding to the white sub-pixel at the second row and mth column is output at S(15m<1), data $W_{3,m}$ corresponding to the white sub-pixel at the third row and mth column is output at S(15m);

when G2 is turned on, data on the 4th, 5th, 6th rows is written to corresponding pixels via the corresponding data lines. For example, data $R_{4,1}$ corresponding to the red sub-pixel in the fourth row and first column is output at S2, data $R_{5,1}$ corresponding to the red sub-pixel in the fifth row and first column is output at S3, data $R_{6,1}$ corresponding to the red sub-pixel at the sixth row and first column is output at S4, . . . , data $W_{4,m}$ corresponding to the white sub-pixel at the fourth row and mth column is output at S(15m−1), data $W_{5,m}$ corresponding to the white sub-pixel at the fifth row and mth column is output at S(15m), data $W_{6,m}$ corresponding to the white sub-pixel at the sixth row and mth column is output at S(15m+1);

. . .

when G(n/3−1) is turned on, data on the (n−5)th, (n−4)th, (n−3)th rows is written to corresponding pixels via the corresponding data lines. For example, data $R_{n-5,1}$ corresponding to the red sub-pixel in the (n−5)th row and first column is output at S1, data $R_{n-4,1}$ corresponding to the red sub-pixel in the (n−4)th row and first column is output at S2, data $R_{n-3,1}$ corresponding to the red sub-pixel at the (n−3)th row and first column is output at S3, . . . , data $W_{n-5,m}$ corresponding to the white sub-pixel at the (n−5)th row and mth column is output at S(15m−2), data $W_{n-4,m}$ corresponding to the blue sub-pixel at the (n−4)th row and mth column is output at S(15m−1), data $W_{n-3,m}$ corresponding to the blue sub-pixel at the (n−3)th row and mth column is output at S(15m);

when G(n/3) is turned on, data on the (n−2)th, (n−1)th, nth rows is written to corresponding pixels via the corresponding data lines. For example, data $R_{n-2,1}$ corresponding to the red sub-pixel in the (n−2)th row and first column is output at S2, data $R_{n-1,1}$ corresponding to the red sub-pixel in the (n−1)th row and first column is output at S3, data $R_{n,1}$ corresponding to the red sub-pixel at the nth row and first column is output at S4, . . . , data $W_{n-2,m}$ corresponding to the white sub-pixel at the (n−2)th row and mth column is output at S(15m−1), data $W_{n-1,m}$ corresponding to the white sub-pixel at the (n−1)th row and mth column is output at S(15m), data $W_{n,m}$ corresponding to the blue sub-pixel at the nth row and mth column is output at S(15m+1).

Figure 17:
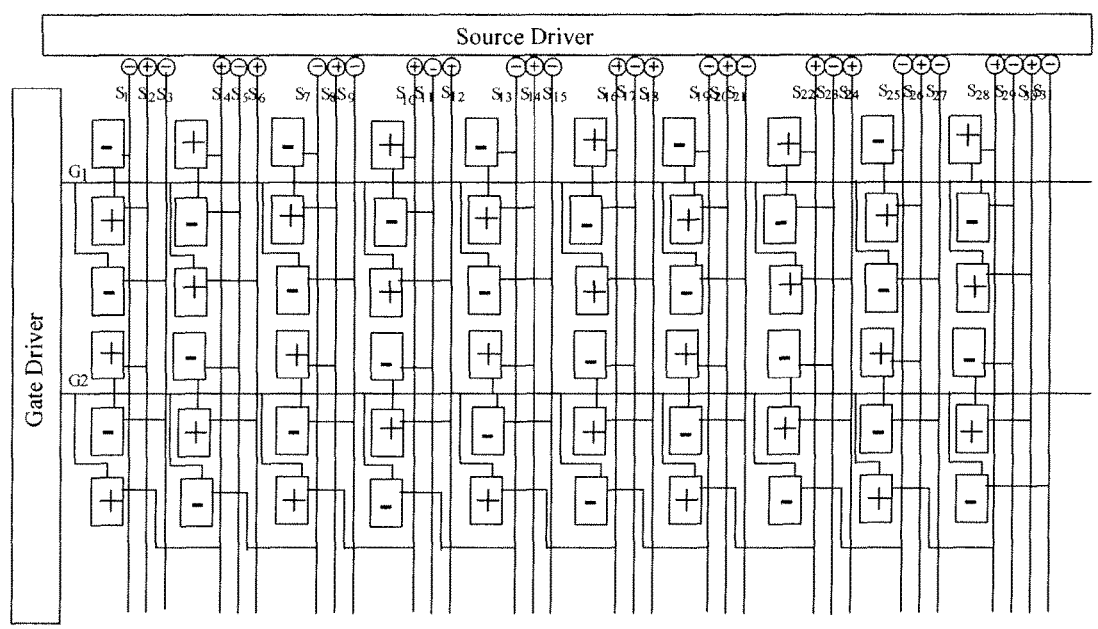
FIG. 17 is a second diagram schematically illustrating polarity inversion of drive signal for the same frame when using five primary colors RGBYW in accordance with the embodiment of the invention.

In the embodiment, as illustrated in the Yth frame (FIG. 16) and the (Y+1)th frame (FIG. 17), when seen from the side of the display panel, the inversion manner for the pixels is dot inversion. When seen from the gate driver side, for the Yth frame, drive signals on the same data line have the same polarity; for the next frame the (Y+1)th frame, drive signals on that data line have a polarity opposite to that of the driver signals for the previous frame the Yth frame, and drive signals on two adjacent data lines are of opposite polarities when displaying the Yth frame. For example, the first and seventh drive signals (the seventh not shown in the figure) on the first data line S1 of FIG. 16 are both positive. In the next frame, the first and seventh drive signals (the seventh not shown in the figure) on the first data line S1 of FIG. 17 are both negative. The first data line S1 and the second data line S2 in both FIG. 16 and FIG. 17 are always of opposite polarities. Therefore, in comparison with the conventional art in which the polarity of the drive signals on each data line has to be inverted once after the scan time of each scan line within one frame, the above technical solution may guarantee the picture quality while reducing the power consumption and the system temperature.

FIG. 7 is a diagram schematically illustrating polarity inversion on data lines S(6j+1), S(6j+2), S(6j+3), S(6j+4), S(6j+5), S(6j+6), S(6j+7) (here j is an integer larger than or equal to 0) of the source driver between different frames, where the high/low level indicates the polarities output on the data lines instead of the specific data output on the data lines.

What are described above is related to the illustrative embodiments of the disclosure only and not limitative to the scope of the disclosure. As N increases, the number of needed scan lines of the gate driver is 1/N, the charge time for each pixel is N times the original charge time, while the needed data lines is multiplied by N. The choosing of N may be determined in consideration of various factors such as cost, process, and revenue and so on. For example, N may also be an odd number such as 5 and 7. Moreover, N may be selected as multiple values for the same display device, according to the value of n, such as, n=8, a combination of N1=3 and N2=5. The above description is only directed to the preferable case of N=3, and n being an integer multiple of N. however, the invention is not limited to the case of N=3 and n being an integer multiple of N.

What are described above is related to the illustrative embodiments of the disclosure only and not limitative to the scope of the disclosure; the scopes of the disclosure are defined by the accompanying claims.

What is claimed is:

1. A liquid crystal display (LCD) panel, comprising:
   a plurality of data lines,
   a plurality of scan lines; and
   a plurality of pixels arranged into a n row m column matrix;
   wherein pixels in the (Ni+1)th, (Ni+2)th . . . and (Ni+N)th rows are connected to the (i+1)th scan line G(i+1), i is a non-negative integer less than or equal to (n/N)−1, N is an odd number greater than or equal to 3, and n is greater than or equal to N
   wherein, there are n/N scan lines and MNm+1 data lines;
   sub-pixels in the jth column are respectively connected to the (Nj−N+1)th, (Nj−N+2)th . . . (Nj−1)th, (Nj)th, (Nj−N+2)th, (Nj−N+3)th . . . (Nj−1)th, (Nj)th, (Nj+1)th data lines S(Nj−N+1), S(Nj−N+2) . . . S(Nj−1), S(Nj), S(Nj−N+2), S(Nj−N+3) . . . S(Nj−1), S(Nj), S(Nj+1) according to the (2Ni+1)th, (2Ni+2)th, (2Ni+3)th . . . (2Ni+2N−1)th, (2Ni+2N)th rows of the sub-pixel matrix where the sub-pixels are located;
   where j is an integer greater than or equal to 1 and less than or equal to Mm, i is a non-negative integer less than or equal to (n/N)−1.

2. The LCD panel of claim 1, wherein each pixel comprises M sub-pixels of different primary colors, sub-pixels of each pixel are arranged along a row direction so as to form a sub-pixel matrix of n row by Mm column, M being 3, 4 or 5.

3. The LCD panel of claim 2, wherein the sub-pixels have an inversion manner of dot inversion.

4. The LCD panel of any of claim 2, wherein,
   drive signals on the same data line have the same polarity for the same frame;
   drive signals on two adjacent data lines have opposite polarities for the same frame;
   drive signals on the same data line have opposite polarities for different frames.

5. The LCD panel of claim 2, wherein,
   the LCD panel employs three primary colors of Red Green Blue, four primary colors of Red Green Blue White, four primary colors of Red Green Blue Yellow or five primary colors of Red Green Blue Yellow White.

6. A liquid crystal display comprising the LCD panel of claim 1.

7. The liquid crystal display of claim 6, further comprises a source driver and a gate driver, wherein the source driver is connected to the LCD panel and has a plurality of drive channels, and supplies drive signals to data lines via the drive channels;
   the gate driver is connected to the LCD panel and has a plurality of drive channels, and supplies drive signals to scan lines via the drive channels.

8. The liquid crystal display of claim 6, wherein each pixel comprises M sub-pixels of different primary colors, sub-pixels of each pixel are arranged along a row direction so as to form a sub-pixel matrix of n row by Mm column, M being 3, 4 or 5.

9. The liquid crystal display of claim 6, wherein,
   drive signals on the same data line have the same polarity for the same frame;
   drive signals on two adjacent data lines have opposite polarities for the same frame;
   drive signals on the same data line have opposite polarities for different frames.

10. The liquid crystal display of claim 8, wherein the sub-pixels have an inversion manner of dot inversion.

11. The liquid crystal display of claim 8, wherein, drive signals on the same data line have the same polarity for the same frame;
   drive signals on two adjacent data lines have opposite polarities for the same frame;
   drive signals on the same data line have opposite polarities for different frames.

12. The liquid crystal display of claim 8, wherein,
   the LCD panel employs three primary colors of Red Green Blue, four primary colors of Red Green Blue White, four primary colors of Red Green Blue Yellow or five primary colors of Red Green Blue Yellow White.

* * * * *